(12) United States Patent
Igarashi et al.

(10) Patent No.: US 8,363,582 B2
(45) Date of Patent: Jan. 29, 2013

(54) WIRELESS COMMUNICATION METHOD, ACCESS POINT, WIRELESS COMMUNICATION STATION AND WIRELESS COMMUNICATION SYSTEM

(75) Inventors: Kei Igarashi, Yokohama (JP); Akira Yamada, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 158 days.

(21) Appl. No.: 12/549,927

(22) Filed: Aug. 28, 2009

(65) Prior Publication Data

US 2010/0054168 A1 Mar. 4, 2010

(30) Foreign Application Priority Data

Sep. 3, 2008 (JP) ................................. 2008-226152

(51) Int. Cl.
*G08C 17/00* (2006.01)
*H04L 12/413* (2006.01)

(52) U.S. Cl. ....................... 370/311; 370/445; 455/343.4

(58) Field of Classification Search .................. 370/310, 370/311, 431, 445; 455/343.1, 343.4
See application file for complete search history.

(56) References Cited

U.S. PATENT DOCUMENTS

| | | | |
|---|---|---|---|
| 5,790,551 A * | 8/1998 | Chan | ............................ 370/458 |
| 2004/0105402 A1 | 6/2004 | Yi et al. | |
| 2005/0254444 A1 | 11/2005 | Meier et al. | |
| 2007/0127478 A1 | 6/2007 | Jokela et al. | |
| 2007/0201505 A1 * | 8/2007 | Yamada et al. | ............... 370/445 |
| 2008/0049703 A1 | 2/2008 | Kneckt et al. | |
| 2008/0062948 A1 | 3/2008 | Ponnuswamy | |
| 2008/0123577 A1 | 5/2008 | Jaakkola et al. | |
| 2009/0052362 A1 | 2/2009 | Meier et al. | |

FOREIGN PATENT DOCUMENTS

| | | |
|---|---|---|
| JP | 09-200118 | 7/1997 |
| JP | 2004-260386 | 9/2004 |
| JP | 2007-096898 | 4/2007 |
| JP | 2007-214795 | 8/2007 |
| JP | 2009-5114 | 1/2009 |
| JP | 2009-89404 | 4/2009 |
| WO | WO 2004/017540 A1 | 2/2004 |

OTHER PUBLICATIONS

"ANSI/IEEE std 802.11 Wireless LAN Medium Access Control (MAC) and Physical Layer (PHY) specifications, 1999", IEEE, Aug. 20, 1999, 528 pages.
Extended European Search Report issued Feb. 9, 2011, in Patent Application No. / Patent No. 09169334.1-2412 / 2161952. Wei Wang, et al., "Adaptive Broadcasting for Similarity Queries in Wireless Content Delivery Systems", IEEE Transactions of Knowledge and Data Engineering, vol. 20, No. 4, XP011202387, Apr. 1, 2008, pp. 504-518.
Office Action issued Oct. 19, 2011, in Chinese Patent Application No. 200910170705.7 filed Sep. 3, 2009 (with English-language Translation).
Office Action Issued Apr. 26, 2012 in Chinese Patent Application No. 200910170705.7 (with English translation).
Office Action issued Aug. 9, 2012, in Japanese Patent Application No. 2008-226152 (with English translation).

* cited by examiner

*Primary Examiner* — Kerri Rose
(74) *Attorney, Agent, or Firm* — Oblon, Spivak, McClelland, Maier & Neustadt, L.L.P.

(57) ABSTRACT

When a wireless communication station, which is about to communicate while intermittently receiving a multicast service, transmits, to an access point, a request packet describing information on the multicast service and an intermittent reception request, the access point describes, in a packet, intermittent reception timing information corresponding to the multicast service information described in this request packet, and replies with this packet to the wireless communication station. The wireless communication station reads the intermittent reception timing information from the received packet, and performs transition to the Awake state or the Doze state according to this intermittent reception timing. The access point, on the other hand, transmits the multicast packet to the wireless communication station according to the intermittent reception timing.

13 Claims, 8 Drawing Sheets

Fig.8

WIRELESS COMMUNICATION METHOD, ACCESS POINT, WIRELESS COMMUNICATION STATION AND WIRELESS COMMUNICATION SYSTEM

BACKGROUND OF THE INVENTION

1. Field of the Invention

The present relates to a wireless communication method, access point, wireless communication station and wireless communication system, for performing wireless communication based on a packet transmission system which allocates wireless bands by CSMA/CA (Carrier Sense Multiple Access with Collision Avoidance).

2. Related Background Art

Recently wireless LAN interfaces are installed in various devices. In particular, the popularization of the IEEE 802.11 standard for personal computers, home electronic products and mobile terminals is remarkable. When a mobile terminal is used as a wireless communication station based on the IEEE 802.11 standard, the critical technology deals with power saving. Document "ANSI/IEEE std 802.11, Wireless LAN medium access control (MAC) and physical layer (PHY) specifications, 1999" describes the technology to implement power saving in wireless communication stations, using the following method.

In a case of one access point communicating with one or more subordinate wireless communication stations, if at least one of the wireless communication stations operates in PS (Power Save) mode, a broadcast packet or a multicast packet is transmitted after sending a special beacon called "DTIM" (Delivery Traffic Indication Message). Here "PS mode" refers to a mode in which a wireless communication station performs communication regularly repeating the Awake (wireless interface ON) state and the Doze (wireless interface OFF) state. The wireless communication station notifies the access point whether the wireless communication station is operating in Active mode (wireless interface is constantly ON) or in the above mentioned PS mode. In this notice, the wireless communication station shows that this wireless communication station is operating in PS mode when a power management bit in the frame control field in the MAC header is "1" in the packet to be transmitted to the access point, and makes use of the fact that this wireless communication station is operating in Active mode when the power management bit is "0". By this, the access point can recognize whether each of the subordinate wireless communication stations is operating in PS mode or in Active mode. If the access point recognizes that one of the subordinate wireless communication stations is operating in PS mode, based on the above method, the access point transmits a broadcast packet or a multicast packet from buffering after transmitting the DTIM beacon.

In the above mentioned prior art, if the wireless communication station to receive multicast service is operating in PS mode, a multicast packet is transmitted after transmitting the DTIM beacon, therefore the multicast packet is transmitted only in the cycle of the DTIM beacon. Generally speaking, the beacon cycle is set to about 100 micro seconds, so the cycle of the DTIM beacon is about several hundred micro seconds. Hence if the multicast service which the radio communication terminal is receiving is such a real-time application as video streaming, quality deterioration as seen in delay jitters may be generated.

This problem occurs because a method for the wireless communication station intermittently receiving multicast packets at an intermittent reception timing, which does not depend on the beacon cycle or DTIM beacon cycle, is not specified in the IEEE 802.11 standard.

SUMMARY OF THE INVENTION

It is an object of the present invention for a wireless communication station to intermittently receive multicast packets at an intermittent reception timing which does not depend on the beacon cycle or DTIM beacon cycle.

Figure 8:
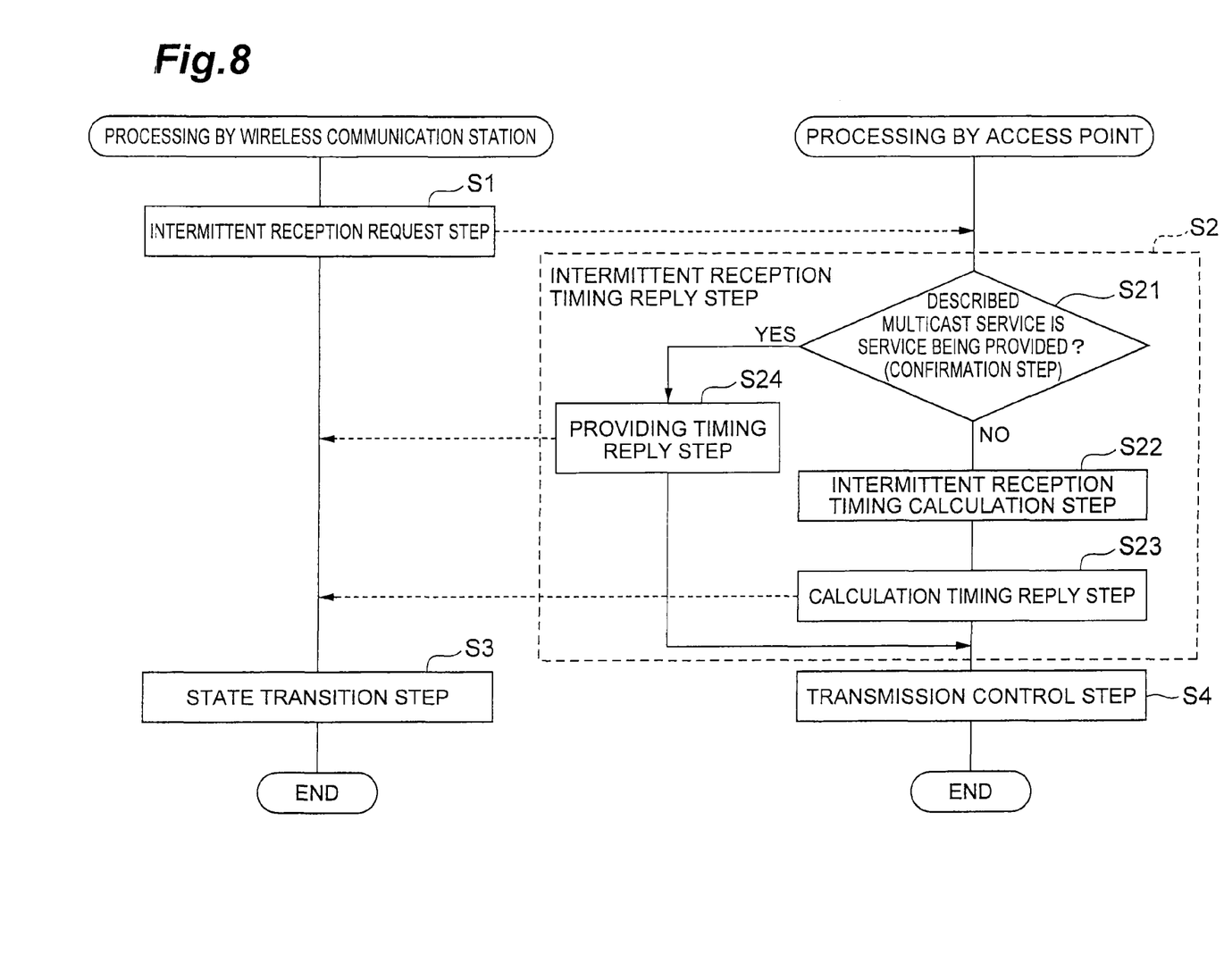
FIG. 8 is a flow chart depicting processing steps of the wireless communication method according to the present invention.

The wireless communication method according to the present invention can be described as follows. A plurality of processing steps constituting the wireless communication method are shown in FIG. 8. In other words, the wireless communication method according to the present invention is a wireless communication method for performing wireless communication between one access point and one or more subordinate wireless communication stations based on a packet transmission system which allocates wireless bands by CSMA/CA, the method including: an intermittent reception request step in which the wireless communication station, which is about to communicate while intermittently receiving a multicast service, transmits, to the access point, a request packet describing information on the multicast service and a request to receive the multicast packet in intermittent reception (step S1 in FIG. 8); a confirmation step in which the access point, upon receiving the transmitted request packet, reads the multicast service information described in the request packet and confirms whether or not the described multicast service is a multicast service currently being provided based on intermittent reception (step S21 in FIG. 8); an intermittent reception timing calculation step in which the access point, upon confirming that the described multicast service is not a multicast service being provided, calculates an intermittent reception timing to ensure quality of the multicast service (step S22 in FIG. 8); a calculation timing reply step in which the access point describes the calculated intermittent reception timing information in a packet and replies with the packet to the wireless communication station (step S23 in FIG. 8); a providing timing reply step in which the access point, upon confirming that the described multicast service is a multicast service being provided, describes, in a packet, intermittent reception timing information of the multicast service being provided, and replies with the packet to the wireless communication station (step S24 in FIG. 8); a state transition step in which the wireless communication station reads the intermittent reception timing information described in the replied packet, and executes transition to an Awake state or a Doze state according to the intermittent reception timing (step S3 in FIG. 8); and a transmission control step in which the access point transmits the multicast packet to the wireless communication stations according to the calculated intermittent reception timing or the intermittent reception timing of the multicast service being provided (step S4 in FIG. 8).

According to this configuration, when a multicast communication is performed between an access point and a plurality of wireless communication stations, the access point and wireless communication stations can negotiate the intermittent reception timing which does not depend on the beacon cycle or DTIM beacon cycle, and the wireless communication stations can receive multicast packets intermittently at an intermittent reception timing which does not depend on the beacon cycle or DTIM beacon cycle.

The wireless communication method according to the present invention can also be described as follows, whereby a similar effect can be implemented. In other words, a wireless communication method according to the present invention is a wireless communication method for performing wireless communication between one access point and one or more subordinate wireless communication stations based on a packet transmission system which allocates wireless bands by CSMA/CA, the method including: an intermittent reception request step in which the wireless communication station, which is about to communicate while intermittently receiving a multicast service, transmits, to the access point, a request packet describing information on the multicast service and a request to receive the multicast packet in intermittent reception (step S1 in FIG. 8); an intermittent reception timing reply step in which the access point, upon receiving the transmitted request packet, describes, in a packet, intermittent reception timing information, corresponding to the multicast service information described in the request packet, and replies with the packet to the radio communication terminal (step S2 in FIG. 8); a state transition step in which the wireless communication station reads the intermittent reception timing information described in the replied packet, and executes transition to an Awake state or a Doze state according to the intermittent reception timing (step S3 in FIG. 8); and a transmission control step in which the access point transmits the multicast packet to the wireless communication station according to the intermittent reception timing (step S4 in FIG. 8).

An access point according to the present invention is an access point which establishes wireless connection with one or more wireless communication stations which can intermittently receive a multicast service based on a packet transmission system which allocates wireless bands by CSMA/CA, including: an intermittent reception timing reply unit for, upon receiving a request packet describing information on a multicast service and a request to receive the multicast packet based on intermittent reception from the wireless communication station, describing, in a packet, the intermittent reception timing information corresponding to the multicast service information described in the request packet, and replying with the packet to the wireless communication station; and a transmission control unit for transmitting the multicast packet to the wireless communication station according to the intermittent reception timing.

According to this configuration, when an intermittent reception request for multicast service is received from a wireless communication station, the access point can notify the wireless communication station of an intermittent reception timing corresponding to this multicast service, and can transmit multicast packets to the wireless communication stations at the intermittent reception timing which does not depend on the beacon cycle.

It is preferable that the intermittent reception timing reply unit further includes: a confirmation unit for, upon receiving the request packet, reading the multicast service information described in the request packet, and confirming whether or not the described multicast service is a multicase service currently being provided based on intermittent reception; an intermittent reception timing calculation unit for, upon confirming that the described multicast service is not a multicast service being provided, calculating an intermittent reception timing to ensure quality of the multicast service; a calculation timing reply unit for describing the calculated intermittent reception timing information in a packet, and replying with the packet to the wireless communication station; and a providing timing reply unit for, upon confirming that the described multicast service is a multicast service being provided, describing, in a packet, intermittent reception timing information of the multicast service being provided, and replying with the packet to the wireless communication station. According to this configuration, regardless of whether or not the multicast service described in the request packet is a multicast service being provided, the access point can notify the wireless communication station of an intermittent reception timing corresponding to this multicast service, and can transmit multicast packets to the wireless communication station at this intermittent reception timing.

It is preferable that the calculation timing reply unit and the providing timing reply unit describe, in the packet, at least one of a start time of a next transmission enabled period of the multicast packet, transmission cycle, maximum number of transmission packets in a predetermined transmission cycle, and maximum transmission enabled period. According to this configuration, the wireless communication station which received the packet can recognize the final intermittent reception timing of the multicast, which the access point calculated.

It is preferable that the providing timing reply unit describes, in a beacon, the intermittent reception timing information of the multicast service being provided, and sends the beacon to the wireless communication station. According to this configuration, if at least one of the plurality of wireless communication stations negotiates the intermittent reception timing with the access point, the other wireless communication stations connected to the access point can recognize the intermittent reception timing by receiving and referring to the beacon, without negotiating with the access point.

It is preferable that the providing timing reply unit describes, in the beacon, at least one of a start time of a next transmission enabled period of the multicast packet, transmission cycle, maximum number of transmission packets in a predetermined transmission cycle, and maximum transmission enabled period. According to this configuration, the wireless communication station can recognize the intermittent reception timing of the multicast service currently being provided by receiving and referring to the beacon.

It is preferable that the access point further includes a subsequent packet buffering information description unit for describing, in a multicast packet to be transmitted in a transmission period based on intermittent reception, information on whether or not the access point buffers a multicast packet subsequent to the multicast packet. According to this configuration, the access point can notify the wireless communication stations whether or not the subsequent multicast packet is buffered.

It is preferable that the access point further includes a final packet information description unit for describing, in said multicast packet to be transmitted in a transition period in the intermittent reception, information on whether or not a multicast packet is the final packet transmitted within said transmission period, regardless of whether or not the subsequent packet is buffered. According to this configuration, the access point can notify the wireless communication station of whether or not the transmitted multicast packet is a final packet to be transmitted in the transmission period.

Another wireless communication station according to the present invention is a wireless communication station which establishes wireless connection with an access point based on a packet transmission system which allocates wireless bands by CSMA/CA, and can intermittently receive multicast service, including: a first intermittent reception request unit for, when communication is about to be performed while intermittently receiving a multicast service, transmitting a request packet describing information on the multicast service and a request to receive the multicast packet based on intermittent reception, to the access point; and a state transition unit for reading the intermittent reception timing information described in the packet replied from the access point, and performing transition to an Awake state or a Doze state according to the intermittent reception timing.

According to this configuration, the wireless communication station can request intermittent reception of the multicast service to the access point, and perform transition to the Awake state or Doze state according to the notified intermittent reception timing.

It is preferable that the wireless communication system further includes a service information confirmation unit for receiving a beacon transmitted from the access point, referring to the providing multicast service information described in the beacon, and confirming whether or not the multicast service information to be received by the wireless communication station is described, and wherein the state transmission unit, when the multicast service information to be received by the wireless communication station is described, reads an intermittent reception timing information of the multicast service described in the beacon, and performs transition to the Awake state or the Doze state according to the intermittent reception timing. According to this configuration, the wireless communication station can confirm whether or not the multicast service to be received by this wireless communication station is currently being provided, and can perform transition of the Awake state and Doze state according to the notified intermittent reception timing if being provided.

It is preferable that the wireless communication station further includes a second intermittent reception request unit for, when the multicast service information to be received by the wireless communication station is not described, transmitting a request packet describing information on the multicast service and a request to receive the multicast packet based on intermittent reception, to the access point. According to this configuration, if it is confirmed that the multicast service, to be received by the wireless communication station, is not currently being provided, the wireless communication station can request the intermittent reception of this multicast service to the access point.

It is preferable that the information on the multicast service includes at least one of a part or all of multicast addresses, maximum packet length, minimum packet length, average packet length, maximum cycle of intermittent reception to be requested, minimum cycle of the intermittent reception, maximum number of transmission packets in a predetermined transmission cycle during intermittent reception, maximum transmission enabled period length, and priority. According to this confirmation, the access point which received the intermittent reception request for the multicast service can recognize a required bandwidth of the multicast service which the wireless communication station is requesting to start.

It is preferable that the wireless communication station further includes a subsequent packet recognition unit for, when a multicast packet describing information on whether or not the access point buffers a subsequent multicast packet is received from the access point, reading the information on whether or not the access point buffers the subsequent multicast packet from the multicast packet and recognizing whether or not a buffering packet to be transmitted after the multicast packet exists, wherein the state transition unit performs transition to the Doze state upon recognizing that a buffering packet to be transmitted after the multicast packet does not exist. According to this configuration, after the multicast packet is received at the intermittent reception timing, the wireless communication station can judge whether or not the Awake state should be maintained to receive a subsequent packet, so that a packet reception error can be prevented, and if there is no subsequent packet, the state can immediately transmit the Doze state, whereby the power saving effect can be implemented.

It is preferable that the wireless communication station further includes a final packet recognition unit for, when a multicast packet describing information on whether or not this multicast packet is the final packet to be transmitted in the transmission period in the intermittent reception is received from the access point, reading the information on whether or not this multicast packet is the final packet from the received multicast packet, and recognizing whether or not the received multicast packet is the final packet, wherein the state transition unit performs transition to the Doze state upon recognizing that the received multicast packet is the final packet. According to this configuration, the wireless communication station can recognize whether or not the received multicast packet is the final packet when a multicast packet is received, and if it is recognized as the final packet, the state can immediately transit to the Doze state, whereby the power saving effect can be implemented.

The present invention can also be regarded as an invention related to a wireless communication system, which can be described as follows.

A wireless communication system according to the present invention is a wireless communication system having an access point and one or more intermittent reception-enabled wireless communication station(s), and establishing wireless connection with each other based on a packet transmission system which allocates wireless bands by CSMA/CA, the access point including: an intermittent timing reply unit for, when a request packet describing information on a multicast service and a request to receive the multicast packet based on intermittent reception is received from the wireless communication station, describing, in a packet, the intermittent reception timing information corresponding to the multicast service information described in the request packet, and replying with the packet to the wireless communication station; and a transmission control unit for transmitting the multicast packet to the wireless communication station according to the intermittent reception timing, and the wireless communication station including: a first intermittent reception request unit for, when communication is performed while intermittently receiving a multicast service, transmitting a request packet describing information on the multicast service and a request to receive the intermittent packet based on intermittent reception, to the access point; and a state transition unit for reading the intermittent reception timing information described in the packet replied from the access point, and performing transition to the Awake state or Doze state according to the intermittent reception timing.

In this case, it is preferable that the intermittent reception timing reply unit of the access point includes: a confirmation unit for, upon receiving the request packet, reading the multicast service information described in the request packet, and confirming whether or not the described multicast service is a multicast service currently being provided based on an intermittent reception; an intermittent reception timing calculation unit for, upon confirming that the described multicast service is not a multicast service being provided, calculating an intermittent reception timing to ensure quality of the multicast service; a calculation timing reply unit for describing the calculated intermittent reception timing information in a packet, and replying with the packet to the wireless communication station; and a providing timing reply unit for, upon confirming that the described multicase service is a multicast service being provided, describing intermittent reception timing information of the multicast service being provided in a packet, and replying with the packet to the wireless communication station.

According to the present invention, when a multicast communication is performed between an access point and a plurality of wireless communication stations, the access point and wireless communication stations can negotiate the intermittent reception timing which does not depend on the beacon cycle or DTIM beacon cycle, and the wireless communication stations can receive multicast packets intermittently at an intermittent reception timing which does not depend on the beacon cycle or DTIM beacon cycle.

DESCRIPTION OF THE PREFERRED EMBODIMENTS

Now embodiments applying a method according to the present invention will be described. In the scenario of the present embodiment to be described, one wireless communication device with an installed wireless LAN interface plays a role of an access point (hereinafter called "AP"), and the other one or more wireless communication device(s) with an installed wireless LAN interface, as a wireless communication station (hereinafter called "STA"), perform(s) wireless LAN communication with the AP.

Figure 1:
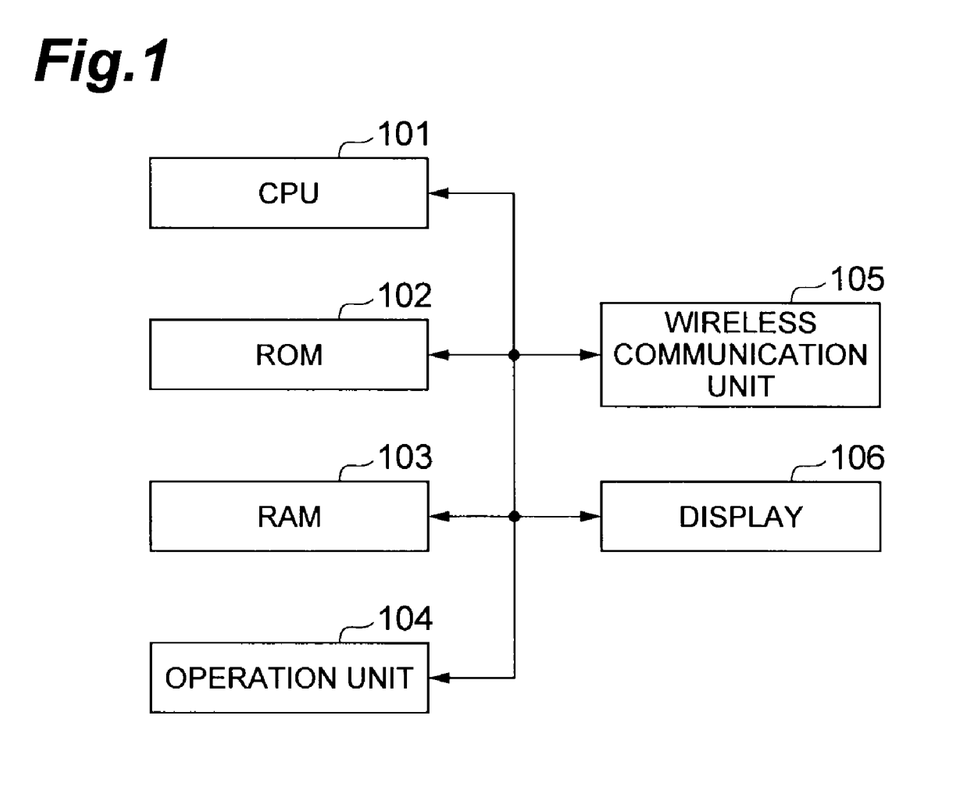
FIG. 1 is a block diagram depicting the respective hardware of the wireless communication station and access point.
Figure 2:
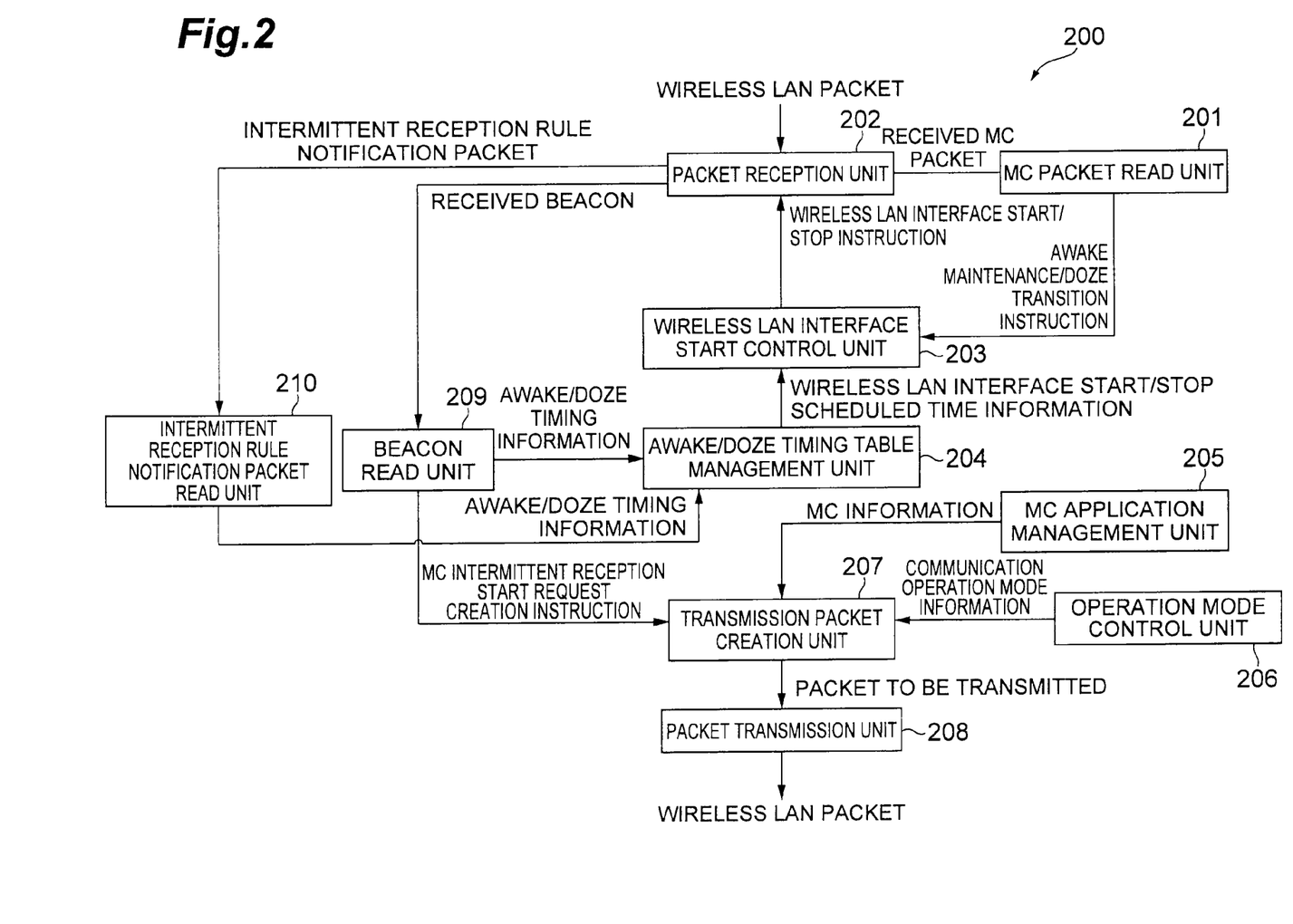
FIG. 2 is a functional block diagram of the wireless communication station.
Figure 3:
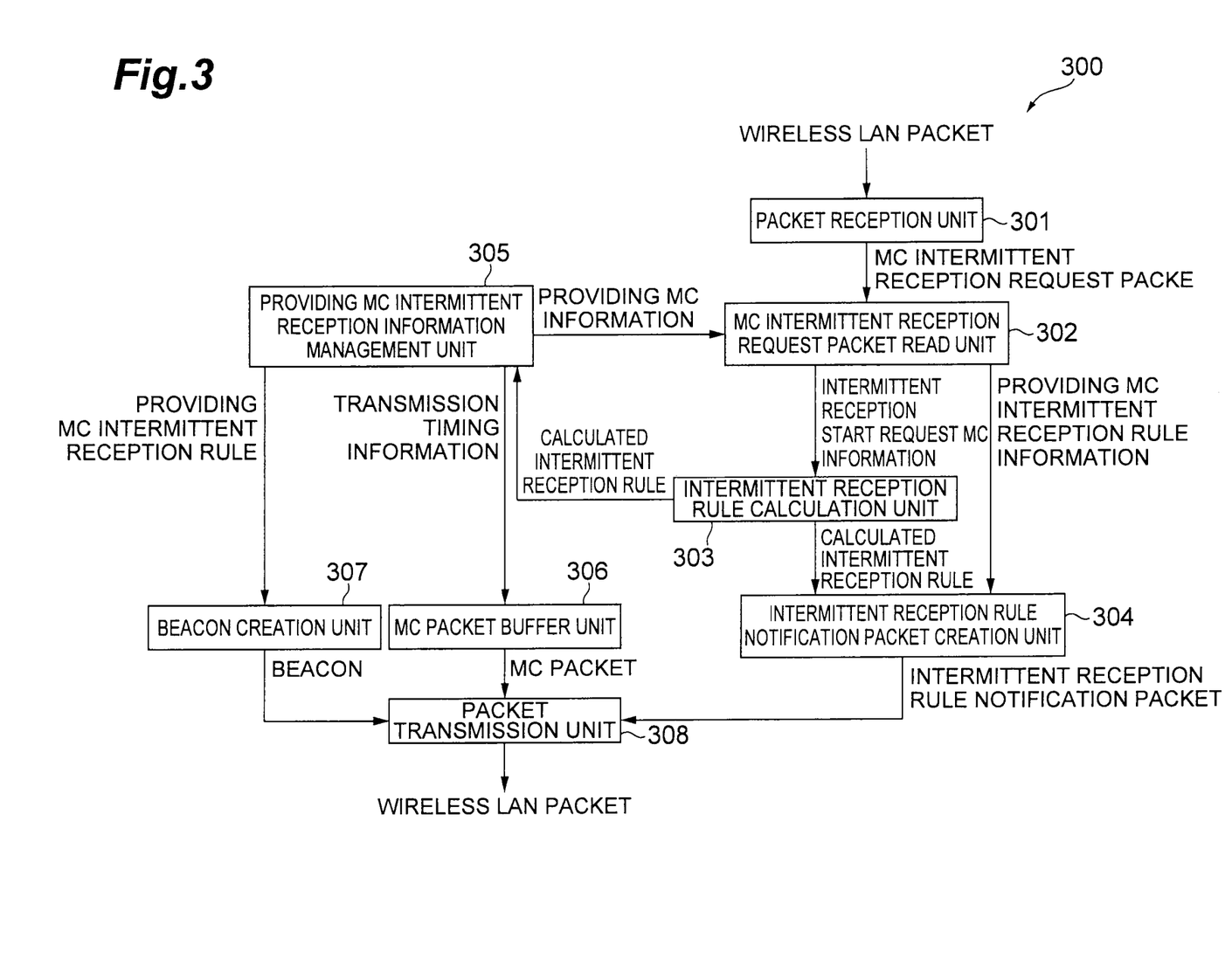
FIG. 3 is a functional block diagram of the access point.

Each STA has a hardware configuration shown in FIG. 1 and a functional block configuration shown in FIG. 2, and AP has a hardware configuration shown in FIG. 1 and a functional block configuration shown in FIG. 3. As FIG. 1 shows, AP or each STA has a CPU 101 which is an information processing device, memories such as ROM 102 and RAM 103, an operation unit 104 such as a keyboard and operation buttons, a wireless communication unit 105 which can perform wireless LAN communication, and a display 106.

Now the functional blocks of STA 200 shown in FIG. 2 will be described. STA 200 has an MC packet read unit 201 which reads a multicast packet ("MC packet") received, a packet reception unit 202 which receives a packet, a wireless LAN interface start control unit 203 which controls the startup of a wireless LAN interface, an Awake/Doze timing table management unit 204 which manages Awake/Doze timing information, an MC application management unit 205 which manages applications ("MC applications") related to the multicast service ("MC service"), an operation mode control unit 206 which controls the operation modes of STA 200, a transmission packet creation unit 207 which creates a packet to be transmitted, a packet transmission unit 208 which transmits a packet, a beacon read unit 209 which reads a received beacon, and an intermittent reception rule notification packet read unit 210 which reads a received intermittent reception rule notification packet.

The MC packet read unit 201 is configured by the wireless communication unit 105, receives a received MC packet from the packet reception unit 202, and transmits an Awake maintenance/Doze transition instruction to the wireless LAN interface start control unit 203.

The packet reception unit 202 is configured by the wireless communication unit 105, receives a wireless LAN packet form the outside, receives a wireless LAN interface start/stop instruction from the wireless LAN interface start control unit 203, transmits the received MC packet to the MC packet read unit 201, transmits a received beacon to the beacon read unit 209, and transmits an intermittent reception rule notification packet to the intermittent reception rule notification packet read unit 210.

The wireless LAN interface start control unit 203 is configured by the wireless communication unit 105, receives the Awake maintenance/Doze transition instruction from the MC packet read unit 201, receives the wireless LAN interface start/stop scheduled time information from the Awake/Doze timing table management unit 204, and transmits the wireless LAN interface start/stop instruction to the packet reception unit 202.

The Awake/Doze timing table management unit 204 is configured by the ROM 102 and RAM 103, receives the Awake/Doze timing instruction from the beacon read unit 209, and transmits the wireless LAN interface start/stop scheduled time information to the wireless LAN interface start control unit 203.

The MC application management unit 205 is configured by the ROM 102 and RAM 103, and transmits the later mentioned information on the multicast service (MC information) to the transmission packet creation unit 207.

The operation mode control unit 206 is configured by the CPU 101 and wireless communication unit 105, and transmits the communication operation mode information to the transmission packet creation unit 207.

The transmission packet creation unit 207 is configured by the CPU 101 and wireless communication unit 105, receives communication operation mode information from the operation mode control unit 206, receives an MC intermittent reception start request creation instruction from the beacon read unit 209, receives MC information from the MC application management unit 205, and transmits the transmission target packet to the packet transmission unit 208.

The packet transmission unit 208 is configured by the wireless communication unit 105, receives the transmission target packet from the transmission packet creation unit 207, and transmits the wireless LAN packet to the outside.

The beacon read unit 209 is configured by the CPU 101 and wireless communication unit 105, receives a received beacon from the packet reception unit 202, transmits the Awake/Doze timing information to the Awake/Doze timing table management unit 204, and transmits the MC intermittent reception request creation instruction to the transmission packet creation unit.

The intermittent reception rule notification packet read unit 210 is configured by the CPU 101 and wireless communication unit 105, receives the intermittent reception rule notification packet from the packet reception unit 202, and transmits the Awake/Doze timing information to the Awake/Doze timing table management unit 204.

The "first intermittent reception request unit" described in Claims is implemented by the MC application management unit 205, transmission packet creation unit 207, and packet transmission unit 208, and the "state transition unit" is implemented by the wireless LAN interface start control unit 203, Awake/Doze timing table management unit 204, beacon read unit 209, and intermittent reception rule notification packet read unit 210.

The "service information confirmation unit" is implemented by the packet reception unit 202 and beacon read unit 209, and the "second intermittent reception request unit" is implemented by the MC application management unit 205, transmission packet creation unit 207, packet transmission unit 208, and beacon read unit 209. The "subsequent packet rec1ognition unit" and "final packet recognition unit" are implemented by the MC packet read unit 201 and packet reception unit 202 respectively.

The functional blocks of AP 300 shown in FIG. 3 will now be described. AP 300 has a packet reception unit 301 which receives a packet, MC intermittent reception request packet read unit 302 which reads the received MC intermittent reception request packet, intermittent reception rule calculation unit 303 which calculates the intermittent reception rule, intermittent reception rule notification packet creation unit 304 which creates an intermittent reception rule notification packet, providing MC intermittent reception information management unit 305 which manages information on MC intermittent reception currently being provided, MC packet buffer unit 306 which buffers MC packets, beacon creation unit 307 which creates a beacon to be transmitted, and packet transmission unit 308 which transmits a packet.

The packet reception unit 301 is configured by the wireless communication unit 105, receives a wireless LAN packet from the outside, and transmits an MC intermittent reception request packet to the MC intermittent reception request packet read unit 302.

The MC intermittent reception request packet read unit 302 is configured by the ROM 102 and RAM 103, receives the MC intermittent reception request packet from the packet reception unit 301, receives the providing MC information from the providing MC intermittent reception information management unit 305, transmits an intermittent reception start request MC information to the intermittent reception rule calculation unit, and transmits the providing MC intermittent reception rule information to the intermittent reception rule notification packet creation unit 304.

The intermittent reception rule calculation unit 303 is configured by the CPU 101, ROM 102 and RAM 103, receives the MC intermittent reception request packet from the MC intermittent reception request packet read unit 302, and sends the calculated intermittent reception rule to the intermittent reception rule notification packet creation unit 304 and the providing MC intermittent reception information management unit 305.

The intermittent reception rule notification packet creation unit 304 is configured by the CPU 101, ROM 102 and RAM 103, receives the providing MC intermittent reception rule information from the MC intermittent reception request packet read unit 302, receives the calculated intermittent reception rule from the intermittent reception rule calculation unit 303, and transmits the intermittent reception rule notification packet to the packet transmission unit 308.

The providing MC intermittent reception information management unit 305 is configured by the ROM 102 and RAM 103, receives the intermittent reception rule from the intermittent reception rule calculation unit 303, transmits the providing MC information to the MC intermittent reception request packet read unit 302, transmits the MC packet buffer unit 306, and transmits the providing MC intermittent reception rule to the beacon creation unit 307.

The MC packet buffer 306 is configured by the ROM 102, RAM 103 and wireless communication unit 105, receives the transmission timing information from the providing MC intermittent reception information management unit 305, and transmits the MC packet to the packet transmission unit 308.

The beacon creation unit 307 is configured by the CPU 101 and wireless communication unit 105, and transmits a beacon to the packet transmission unit 308.

The packet transmission unit 308 is configured by the wireless communication unit 105, receives an intermittent reception rule notification packet from the intermittent reception rule notification packet creation unit 304, receives an MC packet from the MC packet buffer unit 306, and receives a beacon from the beacon creation unit 307.

The "confirmation unit" described in Claims is implemented by the packet reception unit 301, MC intermittent reception request packet read unit 302, and providing MC intermittent reception information management unit 305, and the "intermittent reception timing calculation unit" is implemented by the MC intermittent reception request packet read unit 302, intermittent reception rule calculation unit 303, and providing MC intermittent reception information management unit 305. The "calculation timing reply unit" is implemented by the intermittent reception rule notification packet creation unit 304 and packet transmission unit 308, and the "providing timing reply unit" is implemented by the MC intermittent reception request packet read unit 302, intermittent reception rule notification packet creation unit 304, providing MC intermittent reception information management unit 305, beacon creation unit 307, and packet transmission unit 308.

The "transmission control unit" is implemented by the intermittent reception rule calculation unit 303, providing MC intermittent reception information management unit 305, MC packet buffer unit 306, and packet transmission unit 308, and the "subsequent packet buffering information description unit" and "final packet information description unit" are implemented by the MC packet buffer unit 306 and packet transmission unit 308 respectively.

Figure 4:
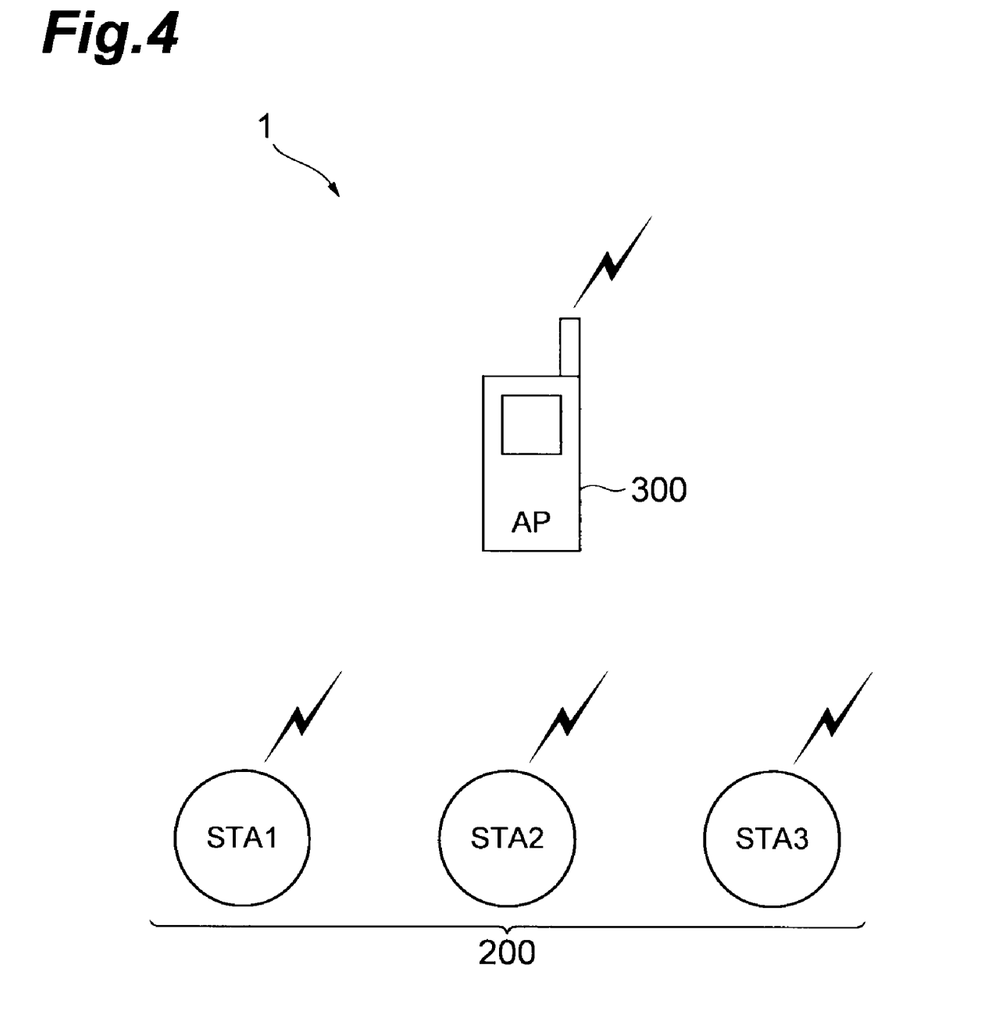
FIG. 4 is a diagram depicting a configuration of the wireless communication system.

FIG. 4 shows a configuration of the wireless communication system according to the present embodiment. As FIG. 4 shows, the wireless communication system 1 is comprised of an AP 300 and a plurality of STAs 200. Here three STAs 200, that is: STA1, STA2 and STA3, are disposed under the AP 300, and perform wireless LAN communication with the AP 300. A number of STAs is not limited to three, but may be any number. It is assumed that STA1, STA2 and STA3 have not started multicast (MC) communication at the current point.

Now the procedure for each STA to start MC communication will be described with reference to FIG. 5. Here an example of STA1 starting MC reception is shown, and the name of the MC service which STA1 receives from the AP is called "MC_A".

Figure 5:
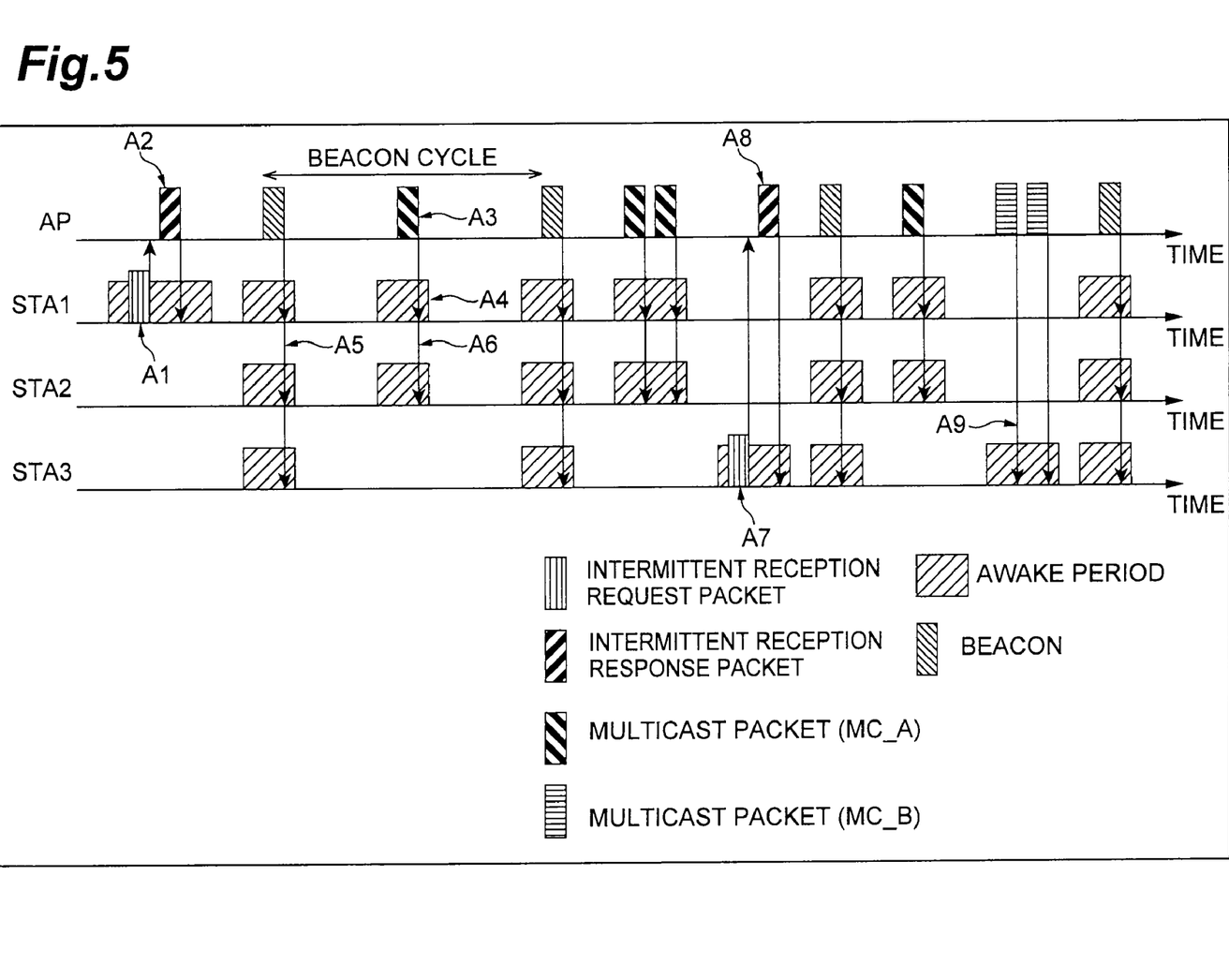
FIG. 5 is a sequence diagram depicting a procedure for each STA (wireless communication station) to start MC communication.

At first, STA1 transmits an MC intermittent reception request packet to AP (A1 in FIG. 5). Information on the MC address (e.g. IP address of the server providing the MC service) and on applications are described in the MC intermittent reception request packet. "Information on applications" is such information as the maximum packet length, minimum packet length and average packet length of packets to be communicated in the MC service, maximum intermittent reception cycle and minimum intermittent reception cycle to be requested, and maximum number of transmission packets, maximum transmission enabled period length and priority in a predetermined transmission cycle during intermittent reception. The MC address may be an entire MC address or may be a predetermined part of this MC address. "Information on the multicast service (MC information)", described in Claims, corresponds to information on a part or all of the MC address and on the above mentioned applications.

AP receives an MC intermittent reception request packet from STA1, reads information on the MC address and on the application(s) described in this packet, and confirms whether or not the multicast service corresponding to this MC address (MC_A in this case) is a multicast service currently being provided. Here it is assumed that MC_A is not being provided.

The AP recognizes that MC_A is not a multicast service currently being provided, calculates a later mentioned intermittent reception rule with which the wireless bandwidth to be allocated to provide this MC_A does not exceed the current bandwidth, and also ensures the quality of this MC, describes the calculated intermittent reception rule in the MC intermittent reception response packet, and transmits it to STA1 (A2 in FIG. 5). The intermittent reception rule includes start time (first packet transmission time), intermittent reception cycle, maximum number of transmission packets in a predetermined transmission cycle, and maximum transmission enabled period, and this intermittent reception rule, along with the MC address, are described in the MC intermittent reception response packet.

Then AP and STA1 perform MC communication based on the intermittent reception rule described in the MC intermittent reception response packet. When the current time becomes the first packet transmission time, MC_A of the MC packet is transmitted by AP (A3 in FIG. 5). STA1 is in the Awake state, and AP transmits the MC packets according to the maximum number of transmission packets and maximum transmission enabled period in the predetermined transmission cycle in the intermittent reception rule which AP negotiated with STA1. A field indicating whether or not a subsequent MC packet of this MC packet is buffered is created in the MC packet to be transmitted. In the present embodiment, this field is called "More Frame field".

STA1, which received the MC packet, refers to the More Frame field in the MC packet, and if it is described that a subsequent MC packet is buffered, the Awake state is maintained. And if it is described that a subsequent MC packet is not buffered, STA1 transits to the Doze state (A4 in FIG. 5).

If the subsequent MC packet which is buffered cannot be transmitted by AP during the transmission enabled period because of the maximum number of transmission packets and maximum transmission enabled period of the negotiated intermittent reception rule, a notification to end transmission is described in the MC packet to be transmitted. According to the present embodiment, the field to describe the notification to end transmission is called a "transmission end notification field". STA1 refers to the transmission end notification field in the received MC packet, and if it is described that transmission ends (that is, this MC packet is the final packet in the predetermined transmission cycle), the state transits to the Doze state.

The AP may describe the start time of the next transmission enabled period in the MC packet. Thereby intermittent reception can be executed in a variable cycle, instead of in a predetermined cycle, and VBR (Variable Bit Rate) applications can also be supported.

The AP may describe the intermittent reception rule of MC_A, for which the AP negotiated with STA1, in a beacon instead of in a regular packet. In this case, it is preferable that the information described in the beacon includes the MC address of MC_A, start time of the next transmission enabled period, transmission cycle, and maximum number of transmission packets in a predetermined transmission cycle and maximum transmission enabled period. Here subordinate STAs other than STA1 receive the beacon in which the above information is described, confirms that the MC address of MC_A (that is, MC address of the multicast service to be received by this STA) is described in the beacon, and reads the start time and transmission cycle of the next transmission enabled period, whereby the intermittent reception timing of this STA can be set. In this way, subordinate STAs other than STA1 can also receive the multicast service of MC_A while suppressing power consumption. In the example in FIG. 5, STA2 receives the beacon (A5 in FIG. 5), confirms that the MC address of the multicast service of MC_A to be received by STA2 described based on the information described in the beacon, and sets the intermittent reception timing of STA2 by reading the start time and transmission cycle in the next transmission enabled period, therefore the multicast service of MC-A can be received while suppressing power consumption (A6 in FIG. 5). STA2 may notify AP that STA2 is receiving MC_A. In this case, AP recognizes that the STAs which receive MC_A are STA1 and STA2, and creates a list of STAs which receive MC_A (MC_A reception STA list).

If STA confirms that the MC address of the multicast service MC_A to be received by STA2 is not included in the information described in the received beacon, on the other hand, STA2 transmits the MC intermittent reception request packet to AP, so that the desired multicast service can be received in a procedure the same as the above mentioned case of STA1.

Now a procedure of STA3 intermittently receiving an MC service which is different from MC_A (service name: MC_B) when STA1 and STA2 are intermittently receiving MC_A will be described. Just like the method for which STA1 negotiated with AP, STA3 transmits the intermittent reception request packet (A7 in FIG. 5), receives the intermittent reception response packet from AP (A8 in FIG. 5), and starts the intermittent reception of MC_B (A9 in FIG. 5). In this case, AP may describe the intermittent reception rule of MC_B for which AP negotiated with STA3 in a beacon. Thereby when subordinate STAs other than STA3 receive MC_B, this STA can set the intermittent reception timing by receiving this beacon and referring to the intermittent reception rule of MC_B, and therefore can receive the multicast packet of MC_B while suppressing power consumption.

Figure 6:
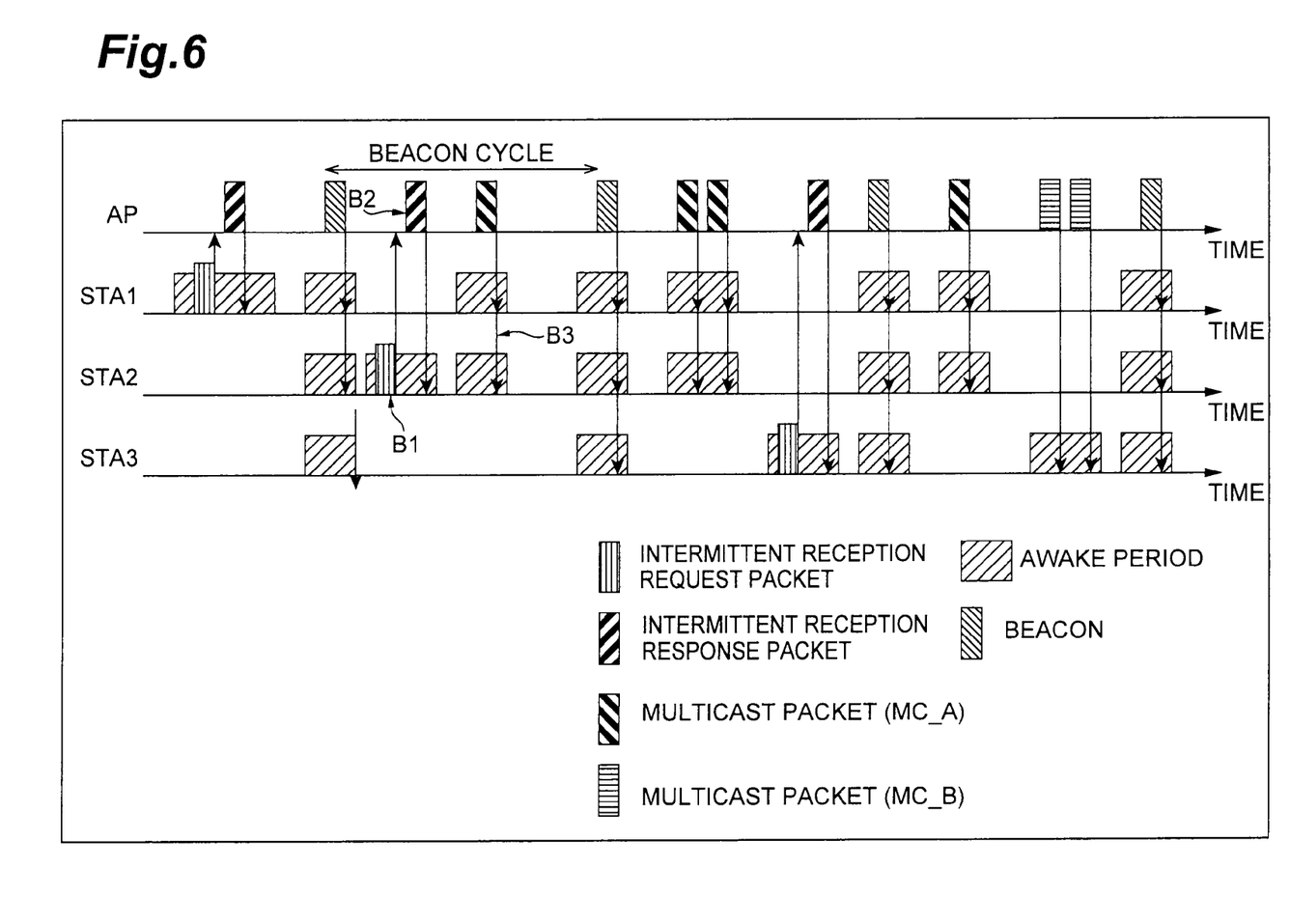
FIG. 6 is a sequence diagram depicting a procedure when AP (access point) does not describe the intermittent reception rule of MC_A in the beacon.

The AP may not have to describe the intermittent reception rule of MC_A, for which AP negotiated with STA1, in the beacon. In this case, in order for a subordinate STA other than STA 1 to receive the multicast of MC_A, this STA independently negotiates with AP. Now this procedure will be described.

As FIG. 6 shows, STA2 transmits an intermittent reception request packet on MC_A to AP (B1 in FIG. 6). Then AP receives the intermittent reception request packet from the STA2, reads information on the MC address and applications described in this packet, and confirms whether or not the MC service corresponding to this MC address (MC_A in this case) is an MC service currently being provided. Since MC_A is currently being provided in this case, AP recognizes that the MC service corresponding to this MC address, that is, the requested MC service (MC_A), is an MC service currently being provided.

Then AP describes information on the intermittent reception rule of MC_A, for which AP negotiated with STA1, in an intermittent reception response packet, and replies with this intermittent reception response packet to STA2 (B2 in FIG.

6). STA2 which received this intermittent reception response packet can set the intermittent reception timing of STA2 (that is the same intermittent reception timing as that of STA1) by referring to the intermittent reception rule of MC_A, and can receive the multicast of MC_A at the intermittent reception timing the same as STA1, while suppressing power consumption (B3 in FIG. 6). In this case, AP can recognize that STAs which receive MC_A are STA1 and STA2, and creates a list of STAs which receive MC_A (MC_A reception STA list).

Figure 7:
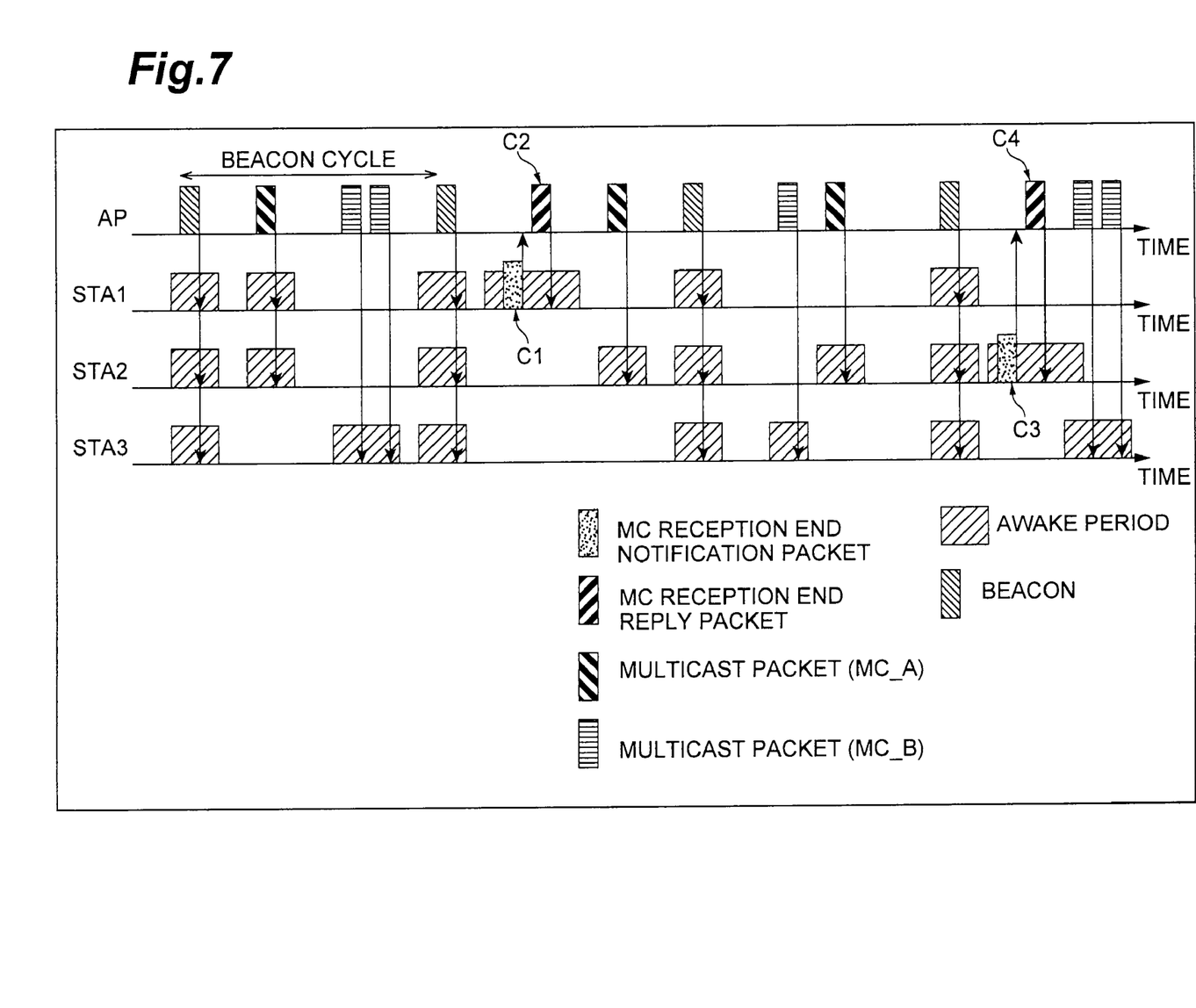
FIG. 7 is a sequence diagram depicting a procedure when STA1 stops reception of the MC_A service.

Now a procedure for STA1 to stop reception of the MC_A service will be described with reference to FIG. 7. Reception of the MC_A service is stopped when, for example, STA1 moves to another cell, or when the user of the STA1 intentionally ends reception of the MC_A service.

STA1 transmits a packet describing the MC reception end notice (MC reception end notification packet) or a disconnection request packet to request disconnecting connection with the AP, to the AP. In the case of the example in FIG. 7, STA1 transmits the MC reception end notification packet to AP (C1 in FIG. 7). In this case, the MC address of MC_A which STA1 is receiving may be described in the MC reception end notification packet.

When the MC reception end notification packet or disconnection request packet from STA1 is received, AP transmits a reply packet for replying to the received packet, to STA1 (C2 in FIG. 7), and deletes STA1 from the MC_A reception STA list which is held by this AP. Thereby the multicast packet of MC_A is no longer transmitted to STA1.

A procedure for STA2 as well to stop reception of the MC_A service after STA1 stops reception of the MC_A service will now be described. Just like STA1, STA2 also transmits, to AP, an MC reception end notification packet or a disconnection request packet to request disconnecting connection with the AP. In the case of the example in FIG. 7, STA2 transmits the MC reception end notification packet to AP (C3 in FIG. 7). When the MC reception end notification packet or the disconnection request packet is received from STA2, AP transmits a reply packet for replying to the received packet to STA2 (C4 in FIG. 7), and deletes STA2 from the MC_A reception STA list which is held by this AP. Since the STA to receive the MC_A service no longer exists, AP stops transmission of the MC_A service, and deletes information on the intermittent reception rule of MC_A from the description information of beacons to be transmitted hereafter. In this case, the AP may instead delete the MC_A reception STA list which is held by the AP.

According to the above described embodiments of the present invention, when AP and STA perform multicast communication, AP and STA can negotiate intermittent reception timing which does not depend on the beacon cycle or DTIM beacon cycle, and STA can execute intermittent reception of the multicast packets at the intermittent reception timing which does not depend on the beacon cycle, or DTIM beacon cycle. STA can also smoothly execute not only the start of execution of intermittent reception, but also the end of intermittent reception.

The disclosure of Japanese Patent Application No. 2008-226152 filed on Sep. 3, 2008 including specification, drawings and claims is incorporated herein by reference in its entirety.

What is claimed is:

1. A wireless communication method for performing wireless communication between one access point and one or more subordinate wireless communication stations based on a packet transmission system which allocates wireless bands by CSMA/CA, the method comprising:
transmitting to the access point, from said wireless communication station, which is about to communicate while intermittently receiving a multicast service, a request packet describing information on said multicast service and a request to receive a multicast packet in intermittent reception;
upon receiving said transmitted request packet in the access point, reading, in the access point, the multicast service information described in said request packet and confirming whether or not said described multicast service is a multicast service currently being provided based on intermittent reception;
upon confirming that said described multicast service is not a multicast service being provided, calculating, in the access point, an intermittent reception timing to ensure quality of said multicast service;
describing the calculated intermittent reception timing information in a packet and replying from the access point with said packet describing the calculated timing information to said wireless communication station;
upon confirming that said described multicast service is a multicast service being provided, describing, in a packet, intermittent reception timing information of the multicast service being provided, and replying from the access point with said packet describing the service timing information to said wireless communication station;
reading, in the wireless communication station, the intermittent reception timing information described in said replied packet describing the service timing information, and executing transition to an Awake state or a Doze state according to said intermittent reception timing; and
transmitting, from the access point, the multicast packet to said wireless communication stations according to said calculated intermittent reception timing or the intermittent reception timing of said multicast service being provided.

2. An access point which establishes wireless connection with one or more wireless communication stations which can intermittently receive a multicast service based on a packet transmission system which allocates wireless bands by CSMA/CA, comprising:
an intermittent reception timing reply unit configured to, upon receiving a request packet describing information on a multicast service and a request to receive a multicast packet based on intermittent reception from said wireless communication station, describe, in a packet, the intermittent reception timing information corresponding to the multicast service information described in said request packet, and reply with said packet describing the timing information to said wireless communication station; and
a transmission control unit configured to transmit the multicast packet to said wireless communication station according to said intermittent reception timing, wherein
the access point describes, in the replied packet, a start time of a next transmission enabled period, transmission cycle, and one of a maximum number of transmission packets in a predetermined transmission cycle or a maximum transmission enabled period in a predetermined transmission cycle in the multicast packet, and
said intermittent reception timing reply unit comprises:
a confirmation unit configured to, upon receiving said request packet, read the multicast service information described in said request packet, and confirm whether or not said described multicast service is a multicast service currently being provided based on intermittent reception;

an intermittent reception timing calculation unit configured to, upon confirming that said described multicast service is not a multicast service being provided, calculate an intermittent reception timing to ensure quality of said multicast service;

a calculation timing reply unit configured to describe the calculated intermittent reception timing information in a packet, and reply with said packet describing the calculated timing information to said wireless communication station; and a providing timing reply unit configured to, upon confirming that said described multicast service is a multicast service being provided, describe, in a packet, intermittent reception timing information of the multicast service being provided, and reply with said packet describing the service timing information to said wireless communication station.

3. The access point according to claim 2, wherein said calculation timing reply unit and said providing timing reply unit describe, in the replied packets, at least one of a start time of a next transmission enabled period of said multicast packet, transmission cycle, maximum number of transmission packets in a predetermined transmission cycle, and maximum transmission enabled period.

4. The access point according to claim 2, wherein said providing timing reply unit describes, in a beacon, the intermittent reception timing information of said multicast service being provided, and sends said beacon to said wireless communication station.

5. The access point according to claim 4, wherein said providing timing reply unit describes, in said beacon, at least one of a start time of a next transmission enabled period of said multicast packet, transmission cycle, maximum number of transmission packets in a predetermined transmission cycle, and maximum transmission enabled period.

6. The access point according to claim 2, further comprising:
a subsequent packet buffering information description unit configured to describe, in a multicast packet to be transmitted in a transmission period based on intermittent reception, information on whether or not said access point buffers a multicast packet subsequent to said multicast packet.

7. The access point according to claim 2, further comprising:
a final packet information description unit configured to describe, in said multicast packet to be transmitted in a transmission period in the intermittent reception, information on whether or not a multicast packet is a final packet transmitted within said transmission period, regardless of whether or not a subsequent packet is buffered.

8. A wireless communication station which establishes wireless connection with an access point based on a packet transmission system which allocates wireless bands by CSMA/CA, and can intermittently receive multicast service, comprising:
a first intermittent reception request unit configured to, when communication is performed while intermittently receiving a multicast service, transmit a request packet describing information on said multicast service and a request to receive a multicast packet based on intermittent reception, to said access point;

a state transition unit configured to read intermittent reception timing information described in a packet replied from said access point, and perform transition to an Awake state or a Doze state according to said intermittent reception timing; and a service information confirmation unit configured to receive a beacon transmitted from said access point, refer to providing multicast service information described in said beacon, and confirm whether or not the multicast service information to be received by said wireless communication station is described, wherein said state transition unit, when the multicast service information to be received by said wireless communication station is described, reads an intermittent reception timing information of said multicast service described in said beacon, and performs transition to the Awake state or the Doze state according to said intermittent reception timing, and the access point describes, in the replied packet, a start time of a next transmission enabled period, transmission cycle, and one of a maximum number of transmission packets in a predetermined transmission cycle or a maximum transmission enabled period in a predetermined transmission cycle in the multicast packet.

9. The wireless communication station according to claim 8, further comprising:
a second intermittent reception request unit configured to, when the multicast service information to be received by said wireless communication station is not described, transmit a request packet describing information on said multicast service and a request to receive said multicast packet based on intermittent reception, to said access point.

10. The wireless communication station according to claim 8, wherein the information on said multicast service includes at least one of a part or all of multicast addresses, maximum packet length, minimum packet length, average packet length, maximum cycle of intermittent reception to be requested, minimum cycle of the intermittent reception, maximum number of transmission packets in a predetermined transmission cycle during intermittent reception, maximum transmission enabled period length, and priority.

11. The wireless communication station according to claim 8 further comprising:
a subsequent packet recognition unit configured to, when a multicast packet describing information on whether or not said access point buffers a subsequent multicast packet is received from said access point, read the information on whether or not said access point buffers said subsequent multicast packet from said multicast packet, and recognize whether or not a buffering packet to be transmitted after said multicast packet exists, and wherein said state transition unit performs transition to the Doze state upon recognizing that a buffering packet to be transmitted after said multicast packet does not exist.

12. The wireless communication station according to claim 8, further comprising:
a final packet recognition unit configured to, when a multicast packet describing information on whether or not this multicast packet is the final packet to be transmitted in the transmission period in the intermittent reception is received from said access point, read the information on whether or not this multicast packet is said final packet from said received multicast packet, and recognize whether or not said received multicast packet is said final packet, and wherein said state transition unit performs transition to the Doze state upon recognizing that said received multicast packet is said final packet.

13. A wireless communication system having an access point and one or more intermittent reception-enabled wireless communication stations, and establishing wireless connection with each other based on a packet transmission system which allocates wireless bands by CSMA/CA, said access point comprising:

an intermittent reception timing reply unit configured to, when a request packet describing information on a multicast service and a request to receive a multicast packet based on intermittent reception is received from said wireless communication station, describe, in a packet, the intermittent reception timing information, corresponding to the multicast service information described in said request packet, and reply with said packet describing the timing information to said wireless communication station; and a transmission control unit configured to transmit the multicast packet to said wireless communication station according to said intermittent reception timing, and said wireless communication station comprising:

a first intermittent reception request unit configured to, when communication is performed while intermittently receiving a multicast service, transmit a request packet describing information on said multicast service and a request to receive the multicast packet based on intermittent reception, to said access point; and a state transition unit configured to read the intermittent reception timing information described in the packet replied from said access point, and perform transition to an Awake state or Doze state according to said intermittent reception timing, wherein the access point describes, in the replied packet, a start time of a next transmission enabled period, transmission cycle, and one of a maximum number of transmission packets in a predetermined transmission cycle or a maximum transmission enabled period in a predetermined transmission cycle in the multicast packet, and said intermittent reception timing reply unit of said access point comprises:

a confirmation unit configured to, upon receiving said request packet, read the multicast service information described in said request packet, and confirm whether or not said described multicast service is a multicast service currently being provided based on an intermittent reception;

an intermittent reception timing calculation unit configured to, upon confirming that said described multicast service is not a multicast service being provided, calculate an intermittent reception timing to ensure quality of said multicast service;

a calculation timing reply unit configured to describe the calculated intermittent reception timing information in a packet, and reply with said packet describing the calculated timing information to said wireless communication station; and a providing timing reply unit configured to, upon confirming that said described multicast service is a multicast service being provided, describe, in a packet, intermittent reception timing information of the multicast service being provided, and reply with said packet describing the service timing information to said wireless communication station.

* * * * *